(12) United States Patent
Zhan et al.

(10) Patent No.: US 11,297,209 B2
(45) Date of Patent: Apr. 5, 2022

(54) MOUNTING BASE STRUCTURE USED FOR PHOTOGRAPHIC LAMP OR MONITOR

(71) Applicant: FUZHOU BOLING PHOTOGRAPHIC EQUIPMENT CO., LTD., Fujian (CN)

(72) Inventors: Wei Zhan, Fujian (CN); Xiaohong Zhan, Fujian (CN)

(73) Assignee: FUZHOU BOLING PHOTOGRAPHIC EQUIPMENT CO., LTD, Fuzhou (CN)

( * ) Notice: Subject to any disclaimer, the term of this patent is extended or adjusted under 35 U.S.C. 154(b) by 205 days.

(21) Appl. No.: 16/493,764

(22) PCT Filed: Oct. 11, 2018

(86) PCT No.: PCT/CN2018/109884
§ 371 (c)(1),
(2) Date: Sep. 13, 2019

(87) PCT Pub. No.: WO2020/062332
PCT Pub. Date: Apr. 2, 2020

(65) Prior Publication Data
US 2021/0337088 A1    Oct. 28, 2021

(30) Foreign Application Priority Data

Sep. 28, 2018 (CN) .......................... 201821583799.1

(51) Int. Cl.
*H04N 5/225* (2006.01)
*F16M 11/12* (2006.01)
*F16M 11/16* (2006.01)
*F16M 13/00* (2006.01)

(52) U.S. Cl.
CPC ......... *H04N 5/2252* (2013.01); *F16M 11/121* (2013.01); *F16M 11/16* (2013.01); *F16M 13/005* (2013.01); *H04N 5/2256* (2013.01)

(58) Field of Classification Search
CPC .. H04N 5/2252; H04N 5/2256; F16M 11/121; F16M 11/16; F16M 3/005
See application file for complete search history.

(56) References Cited

U.S. PATENT DOCUMENTS

| | | | | |
|---|---|---|---|---|
| 5,790,194 A * | 8/1998 | Shimamura | .......... | H04N 5/2222 348/375 |
| 9,746,659 B2 * | 8/2017 | Doi | ........................ | G02B 21/22 |
| 10,638,626 B1 * | 4/2020 | Park | ..................... | H04N 5/2252 |
| 2015/0301326 A1 * | 10/2015 | Doi | ..................... | G02B 21/367 348/45 |

(Continued)

*Primary Examiner* — Amy R Hsu

(57) ABSTRACT

A mounting base structure used for a photographic lamp or monitor comprises a first connecting rod having an end rotatably connected with one side of a photographic lamp or monitor and an end provided with a connecting part. A second connecting rod to be attached to the first connecting rod is hinged to the connecting part. A first threaded hole to be connected with a connecting bolt on a digital video camera is horizontally formed in the side face of the other end of the second connecting rod. The mounting base structure used for the photographic lamp or monitor is simple and compact and facilitates the connection of the photographic lamp or monitor with the digital video camera.

11 Claims, 2 Drawing Sheets

(56) References Cited

U.S. PATENT DOCUMENTS

| | | | |
|---|---|---|---|
| 2016/0252798 A1* | 9/2016 | Igi | H04N 5/2252 |
| | | | 348/375 |
| 2017/0078579 A1* | 3/2017 | Akiyama | H04N 5/23293 |
| 2018/0191959 A1* | 7/2018 | Neufeldt | F16M 13/027 |
| 2018/0275493 A1* | 9/2018 | Hirota | G03B 17/563 |

* cited by examiner

MOUNTING BASE STRUCTURE USED FOR PHOTOGRAPHIC LAMP OR MONITOR

CROSS REFERENCE TO RELATED APPLICATIONS

This application is the national phase entry of International Application No. PCT/CN2018/109884, filed on Oct. 11, 2018, which is based upon and claims priority to Chinese Application No. CN 201821583799.1 filed on Sep. 25, 2018, the entire contents of which are incorporated herein by reference.

FIELD AND BACKGROUND OF THE INVENTION

The invention relates to a mounting base structure used for a photographic lamp or monitor.

Nowadays, when a photographic lamp or monitor is connected with a digital video camera, the angle is generally constant and cannot be adjusted. For instance, when vertically connected with the digital video camera, the photographic lamp has to be kept vertical and cannot be adjusted. In addition, once connected with the photographic lamp, the digital video camera provided with only one connecting stand used for mounting the photographic lamp or monitor cannot be connected with other equipment anymore such as a microphone. In view of this, a mounting base used for the photographic lamp or monitor is needed.

SUMMARY OF THE INVENTION

The objective of the invention is to provide a simple and compact mounting base structure used for a photographic lamp or monitor to facilitate the connection of the photographic lamp or monitor with a digital video camera or related equipment.

The technical solution of the invention is as follows: a mounting base structure used for a photographic lamp or monitor comprises a first connecting rod, wherein the first connecting rod has an end rotatably connected with one side of a photographic lamp or monitor and an end provided with a connecting part, a second connecting rod to be attached to the first connecting rod is hinged to the connecting part, and a first threaded hole to be connected with a connecting bolt on a digital video camera is horizontally formed in the side face of the other end of the second connecting rod.

Furthermore, a connecting tip protruding outwards is arranged at one end of the first connecting rod, a first concave part allowing a convex part of the photographic lamp or monitor to be inlaid therein is arranged on the inner side of the connecting tip, a POM gasket is arranged between the first concave part and the convex part, a second concave part is arranged on the outer side of the connecting tip, a cap washer is inlaid in the second concave part, and a connecting bolt which penetrates through the connecting tip and the POM gasket to be connected with the convex part is arranged in the cap washer.

Furthermore, the connecting part is provided with a clamping groove, the second connecting rod has a flat end inserted into the clamping groove, a through hole is formed in the middle of one end of the second connecting rod, a POM shaft sleeve is mounted in the through hole, and a lock bolt penetrating through the POM shaft sleeve is lengthwise arranged on the connecting part.

Furthermore, the connecting part and the first connecting rod are integrally formed in an L shape.

Furthermore, the connecting part is lengthwise provided with a second threaded hole, and the other end of the second connecting rod is lengthwise provided with a third threaded hole and is vertically provided with a fourth threaded hole.

Furthermore, the diameters of the first threaded hole, the second threaded hole, the third threaded hole, and the fourth threaded hole are identical.

Furthermore, a recess hole allowing the connecting tip to be recessed therein when the second connecting rod is attached to the first connecting rod is formed in the middle of the second connecting rod.

Compared with the prior art, the invention has the following advantages: the mounting base structure used for a photographic lamp or monitor is simple and compact and facilitates the connection of the photographic clamp or monitor with a digital video camera or related equipment; and the mounting base structure is convenient to use and capable of rotating in the X-axis direction, the Y-axis direction, and the Z-axis direction, and can also be connected with equipment such as a microphone, thereby having a wider application range.

REFERENCE SIGNS 10, photographic lamp or monitor; 11, convex part; 20, first connecting rod; 21, connecting part; 22, connecting tip; 23, POM gasket; 24, cap washer; 25, connecting bolt; 26, clamping groove; 27, second threaded hole; 30, second connecting rod; 31, first threaded hole; 32, POM shaft sleeve; 33, lock bolt; 34, third threaded hole; 35, fourth threaded hole; 36, recess hole.

DESCRIPTION OF THE PREFERRED EMBODIMENTS

For a better understanding of the characteristics and advantages of the invention, the following embodiments are provided to expound the invention in combination with the accompanying drawings. However, the invention is not limited to these embodiments.

Figure 1:
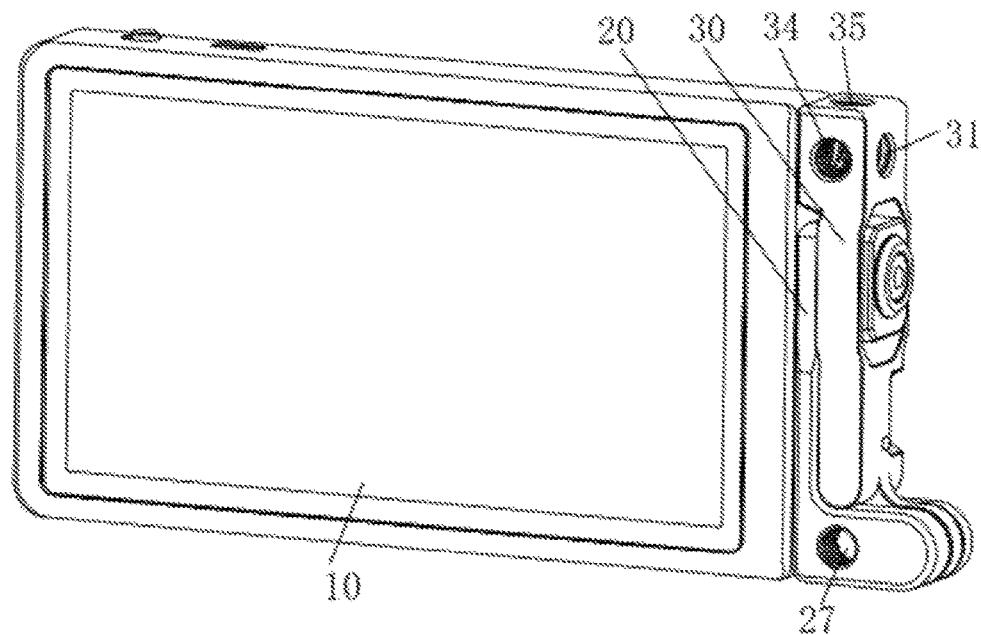
FIG. 1 is a structural diagram of the invention.
Figure 2:
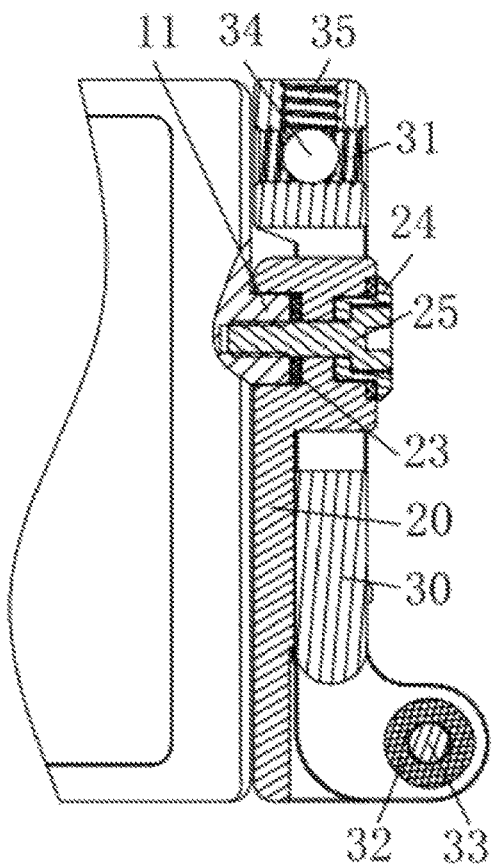
FIG. 2 is a sectional view of the invention.
Figure 3:
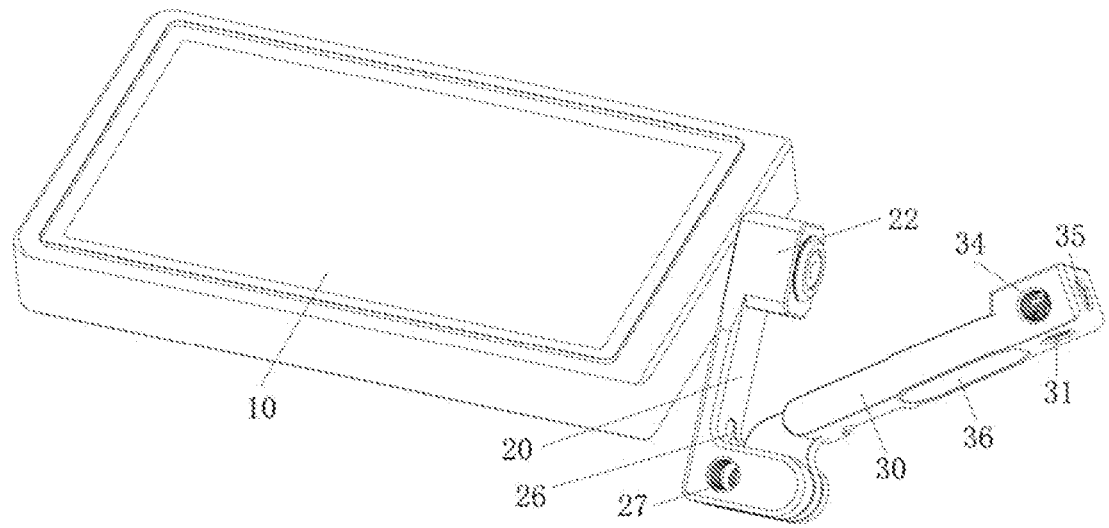
FIG. 3 is a first schematic diagram of the invention in an unfolded state.
Figure 4:
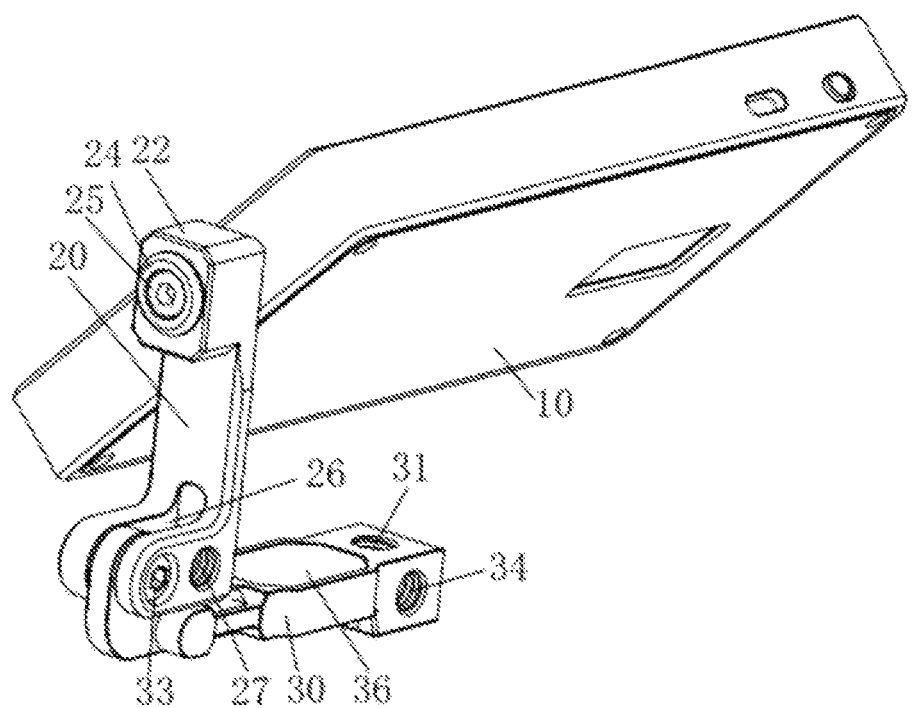
FIG. 4 is a second schematic diagram of the invention in an unfolded state.

Please refer to FIG. 1-FIG. 4.

A mounting base structure used for a photographic lamp or monitor comprises a first connecting rod 20, wherein one end of the first connecting rod 20 is rotatably connected with one side of a photographic lamp or monitor 10, and the other end of the first connecting rod is provided with a connecting part 21. A second connecting rod 30 to be attached to the first connecting rod is hinged to the connecting part, a first threaded hole 31 to be connected with a connecting bolt on a digital video camera is horizontally formed in the side face of the other end of the second connecting rod, and the photographic lamp or monitor can be connected with the digital video camera via the first threaded hole when used.

In this embodiment, a connecting tip 22 protruding outwards is arranged at one end of the first connecting rod, a first concave part allowing a convex part 11 of the photographic lamp or monitor to be inlaid therein is arranged on the inner side of the connecting tip, a POM gasket 23 is arranged between the first concave part and the convex part, and a second concave part is arranged on the outer side of the connecting tip, a cap washer 24 is inlaid in the second concave part, a connecting bolt 25 penetrating through the connecting tip and the POM gasket to be connected with the convex part is arranged in the cap washer, and the first connecting rod can be kept stable through the POM gasket when rotating to any positions.

In this embodiment, the connecting part is provided with a clamping groove 26, and the second connecting rod has a flat end inserted into the clamping groove; a through hole is formed in the middle of one end of the second connecting rod, and a POM shaft sleeve 32 is mounted in the through hole; a lock bolt 33 which penetrates through the POM shaft sleeve to connect the first connecting rod and the second connecting rod is lengthwise arranged on the connecting part, and the POM shaft sleeve can keep the mounting base structure in a stable state when any angle is formed between the second connecting rod and the first connecting rod.

In this embodiment, the connecting part and the first connecting rod are integrally formed in an L shape, so that the second connecting rod can be hinged to the connecting part more easily.

In this embodiment, to facilitate connection with other equipment such as a microphone, the connecting part is lengthwise provided with a second threaded hole 27, and the other end of the second connecting rod is lengthwise provided with a third threaded hole 34 and is vertically provided with a fourth threaded hole 35. The photographic lamp or monitor can be connected with the digital video camera or related equipment directly via the second threaded hole, the third threaded hole, or the fourth threaded hole according to using requirements.

In this embodiment, the first threaded hole, the second threaded hole, the third threaded hole and the fourth threaded hole have the same diameter and are all international standard holes which can be connected with the connecting bolt on the digital video camera, and the photographic lamp or monitor is connected with a microphone or other photographic equipment via the first threaded hole, the second threaded hole, the third threaded hole, or the fourth threaded hole.

In this embodiment, a recess hole 36 allowing the connecting tip to be recessed therein when the second connecting rod is attached to the first connecting rod is formed in the middle of the second connecting rod, so that the second connecting rod can be better attached to the first connecting rod, and the storage space is reduced.

The above embodiments are only preferred ones of the invention, and any equivalent variations and modifications achieved in terms of the patent scope of the invention should also fall within the protection scope of the invention.

What is claimed is:

1. A mounting base structure used for a photographic lamp or monitor, comprising a first connecting rod, wherein the first connecting rod has an end rotatably connected with a side of a photographic lamp or monitor and an end provided with a connecting part, a second connecting rod to be attached to the first connecting rod is hinged to the connecting part, and a first threaded hole to be connected with a connecting bolt on a digital video camera is horizontally formed in a side face of an end of the second connecting rod, the connecting part is provided with a clamping groove, the second connecting rod has a flat end inserted into the clamping groove, a through hole is formed in a middle of an end of the second connecting rod, a polyoxymethylene (POM) shaft sleeve is mounted in the through hole, and a lock bolt which penetrates through the POM shaft sleeve is lengthwise arranged on the connecting part.

2. A mounting base structure used for a photographic lamp or monitor according to claim 1, wherein a connecting tip protruding outwards is arranged at one said end of the first connecting rod, a first concave part allowing a convex part of the photographic lamp or monitor to be inlaid therein is arranged on an inner side of the connecting tip, a polyoxymethylene (POM) gasket is arranged between the first concave part and the convex part, a second concave part is arranged on an outer side of the connecting tip, a cap washer is inlaid in the second concave part, and a connecting bolt which penetrates through the connecting tip and the POM gasket to be connected with the convex part is arranged in the cap washer.

3. The mounting base structure used for a photographic lamp or monitor according to claim 2, wherein a recess hole allowing the connecting tip to be recessed therein when the second connecting rod is attached to the first connecting rod is formed in a middle of the second connecting rod.

4. The mounting base structure used for a photographic lamp or monitor according to claim 1, wherein the connecting part and the first connecting rod are integrally formed in an L shape.

5. A mounting base structure used for a photographic lamp or monitor according to claim 4, wherein a connecting tip protruding outwards is arranged at one said end of the first connecting rod, a first concave part allowing a convex part of the photographic lamp or monitor to be inlaid therein is arranged on an inner side of the connecting tip, a POM gasket is arranged between the first concave part and the convex part, a second concave part is arranged on an outer side of the connecting tip, a cap washer is inlaid in the second concave part, and a connecting bolt which penetrates through the connecting tip and the POM gasket to be connected with the convex part is arranged in the cap washer.

6. The mounting base structure used for a photographic lamp or monitor according to claim 1, wherein the connecting part is lengthwise provided with a second threaded hole, and the second connecting rod has an end lengthwise provided with a third threaded hole and vertically provided with a fourth threaded hole.

7. A mounting base structure used for a photographic lamp or monitor according to claim 6, wherein a connecting tip protruding outwards is arranged at one said end of the first connecting rod, a first concave part allowing a convex part of the photographic lamp or monitor to be inlaid therein is arranged on an inner side of the connecting tip, a POM gasket is arranged between the first concave part and the convex part, a second concave part is arranged on an outer side of the connecting tip, a cap washer is inlaid in the second concave part, and a connecting bolt which penetrates through the connecting tip and the POM gasket to be connected with the convex part is arranged in the cap washer.

8. The mounting base structure used for a photographic lamp or monitor according to claim 6, wherein the connecting part and the first connecting rod are integrally formed in an L shape.

9. The mounting base structure used for a photographic lamp or monitor according to claim 6, wherein diameters of the first threaded hole, the second threaded hole, the third threaded hole, and the fourth threaded hole are identical.

10. A mounting base structure used for a photographic lamp or monitor according to claim 9, wherein a connecting tip protruding outwards is arranged at one said end of the first connecting rod, a first concave part allowing a convex part of the photographic lamp or monitor to be inlaid therein is arranged on an inner side of the connecting tip, a POM gasket is arranged between the first concave part and the convex part, a second concave part is arranged on an outer side of the connecting tip, a cap washer is inlaid in the second concave part, and a connecting bolt which penetrates through the connecting tip and the POM gasket to be connected with the convex part is arranged in the cap washer.

11. The mounting base structure used for a photographic lamp or monitor according to claim 9, wherein the connecting part and the first connecting rod are integrally formed in an L shape.

\* \* \* \* \*